United States Patent [19]
Bokalders et al.

[11] 3,974,919
[45] Aug. 17, 1976

[54] PRESS UNLOADER

[75] Inventors: Janis A. Bokalders, Golf; Rade Jurich, Oak Lawn, both of Ill.

[73] Assignee: Wehr Corporation, Milwaukee, Wis.

[22] Filed: Oct. 5, 1970
(Under Rule 47)

[21] Appl. No.: 77,807

[52] U.S. Cl. ................................ 214/1 BT; 53/60; 214/309; 294/64 R
[51] Int. Cl. .............................................. B66c 1/02
[58] Field of Search ............... 214/1 BT, 309, 1 BH, 214/1 BV; 294/64, 65; 53/60, 57

[56] References Cited
UNITED STATES PATENTS

| | | | |
|---|---|---|---|
| 2,809,769 | 10/1957 | Clarke | 214/1 BT X |
| 2,867,185 | 1/1959 | Hayward | 214/1 BV X |
| 3,087,629 | 4/1963 | Sharpe | 214/1 BT |
| 3,174,789 | 3/1965 | Scherr | 214/1 BV |
| 3,209,923 | 10/1965 | Bargel | 214/1 BT |
| 3,453,802 | 7/1970 | Riddington | 53/60 |
| 3,465,495 | 9/1969 | Zwiacher | 214/1 BT X |
| 3,513,989 | 5/1970 | English | 214/1 BV |
| 3,653,525 | 4/1972 | Merkner | 214/309 |

FOREIGN PATENTS OR APPLICATIONS

| | | | |
|---|---|---|---|
| 1,241,802 | 8/1960 | France | 214/1 BT |
| 1,914,437 | 3/1969 | Germany | 214/1 BV |
| 6,508,143 | 12/1965 | Netherlands | 214/16.1 C |

*Primary Examiner*—Robert J. Spar
*Assistant Examiner*—George F. Abraham
*Attorney, Agent, or Firm*—Hofgren, Wegner, Allen, Stellman & McCord

[57] ABSTRACT

An unloading apparatus for a briquette press, or the like, including a horizontally movable carriage with a plurality of vacuum cups on one end thereof for seizing articles from the press. The carriage is provided with rollers that roll on stationary frame tracks to permit reciprocation of the carriage with cranks being provided between the rollers and the carriage frame so that the carriage may be lifted and lowered at the article seizing station. A drive system is provided that reciprocates the unloading carriage by chains and sprockets, and through the provision of cams for operating the cranks, the entire carriage is pivoted downwardly or upwardly while maintaining it horizontal during article seizing. A control is provided having both automatic and manual modes effecting the proper interlocking between operation of the unloading apparatus and the associated press.

The control system senses the presence of briquettes in the article seizing vacuum cups and provides signals to a counter that, through appropriate circuitry, terminates operation of the associated press if all briquettes are not present in the unloader. Also provided is a control that inhibits operation of the unloader until the press is operating and ready to be unloaded.

14 Claims, 14 Drawing Figures

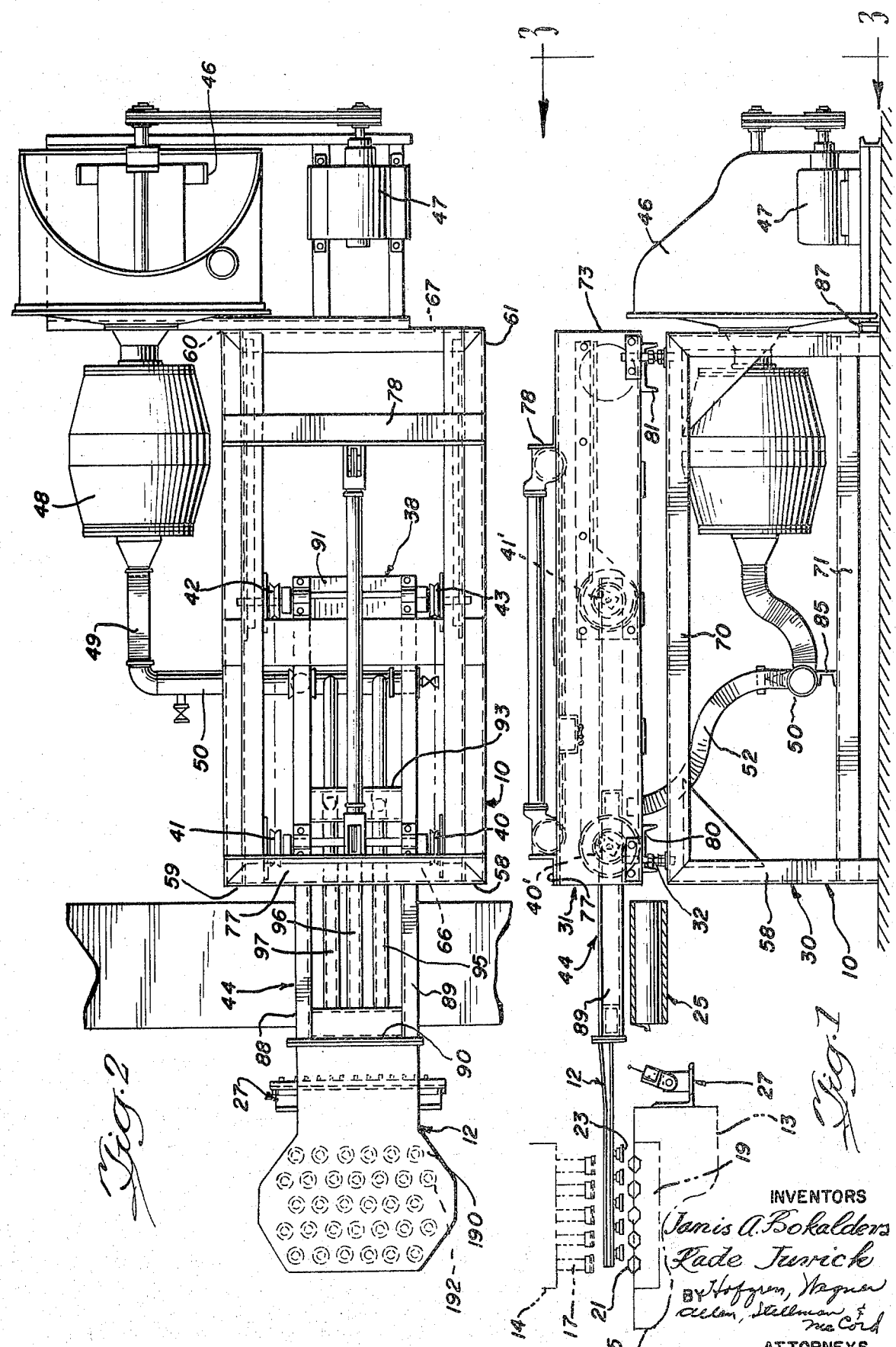

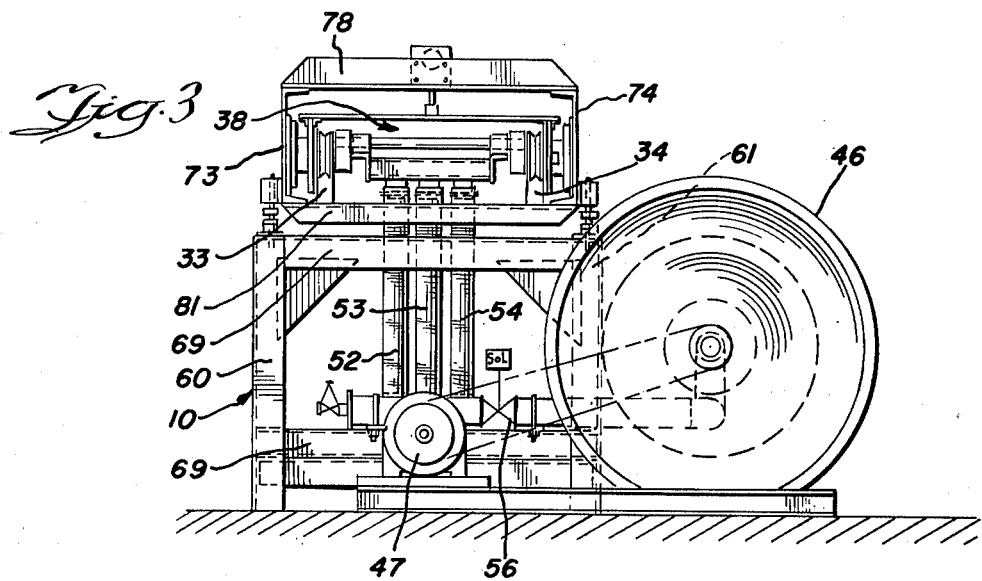
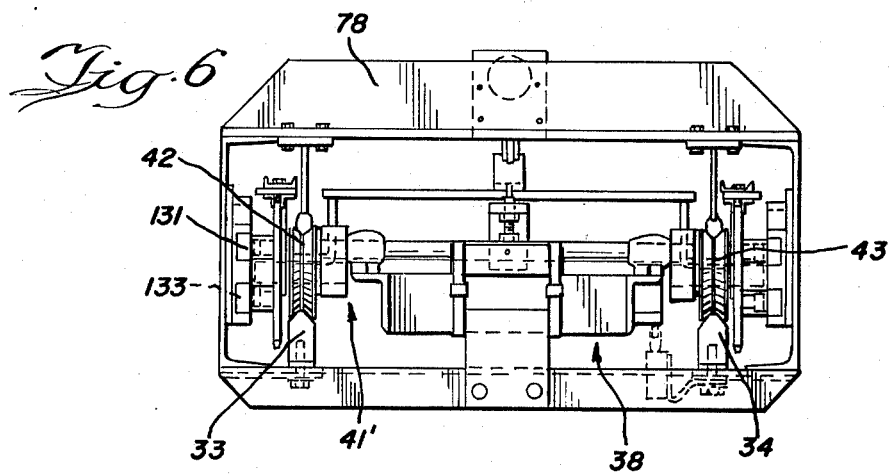
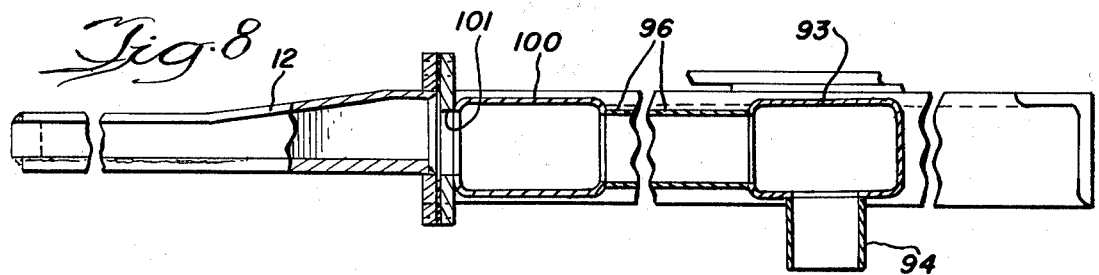
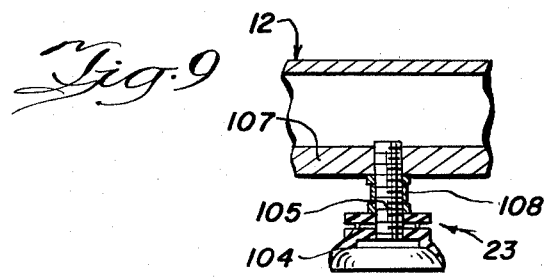

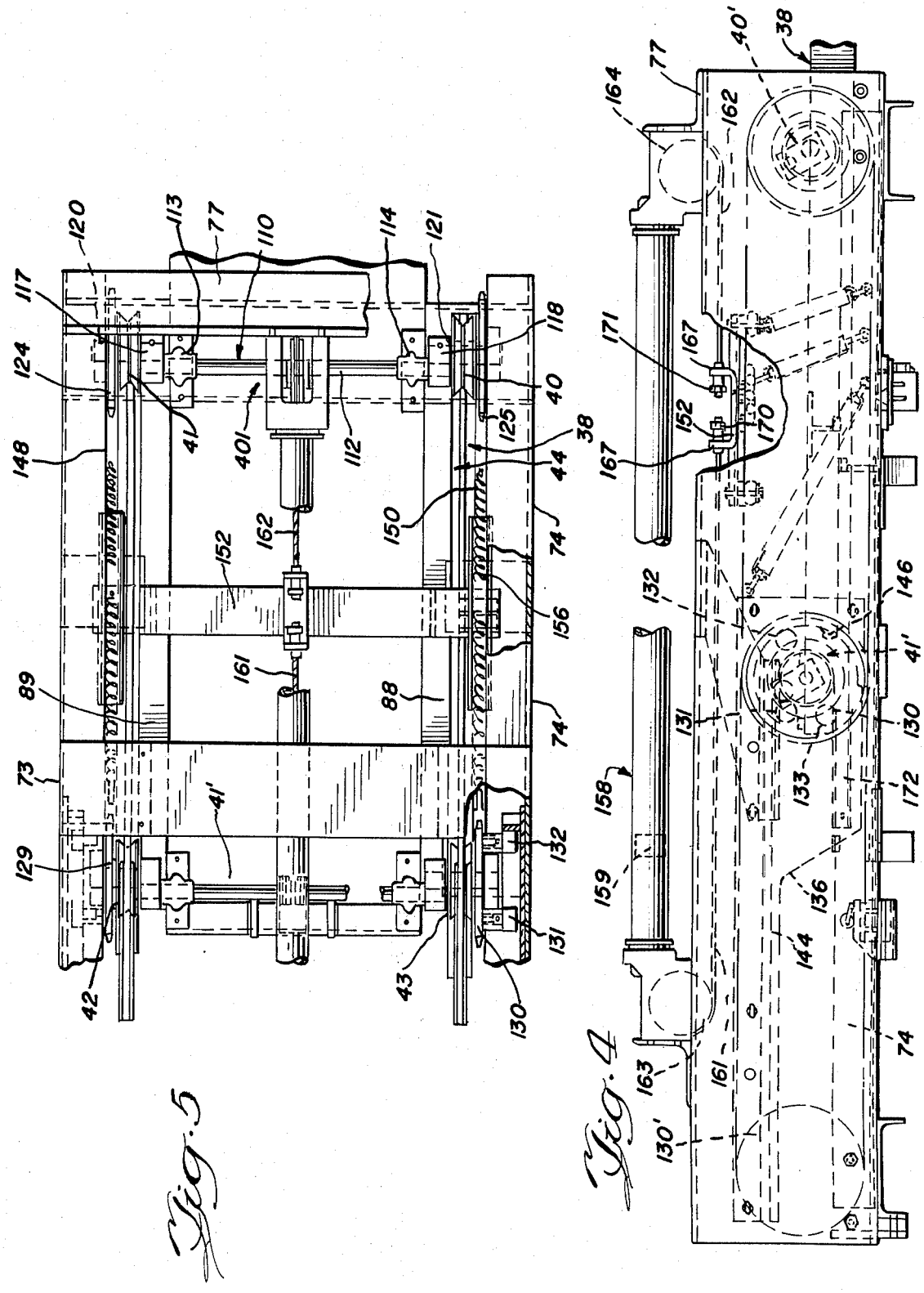

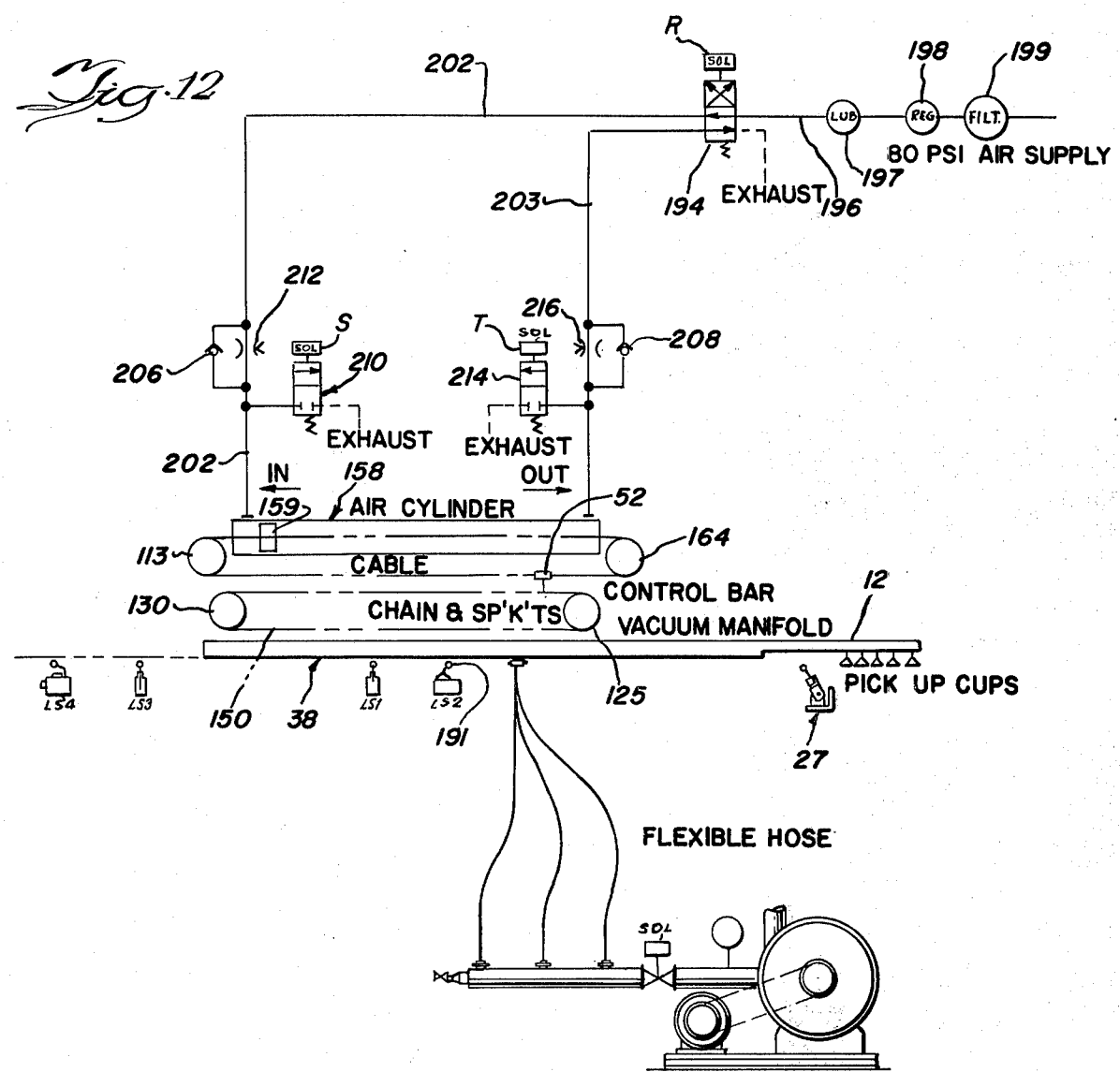
CONTROL SCHEMATIC OF VACUUM & AIR SUPPLY SYSTEMS WITH LIMIT SWITCHES
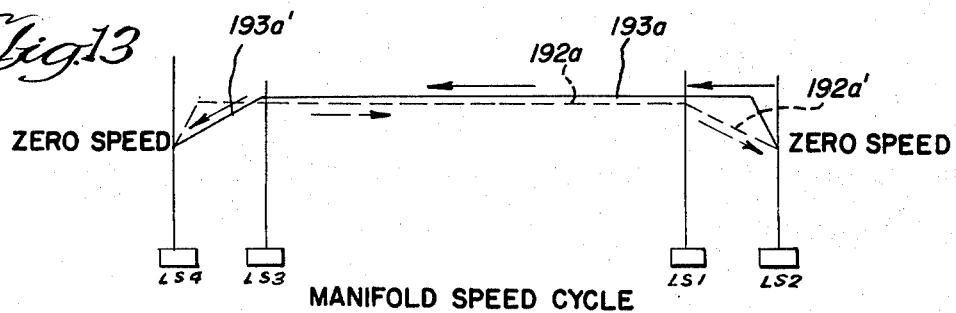
MANIFOLD SPEED CYCLE

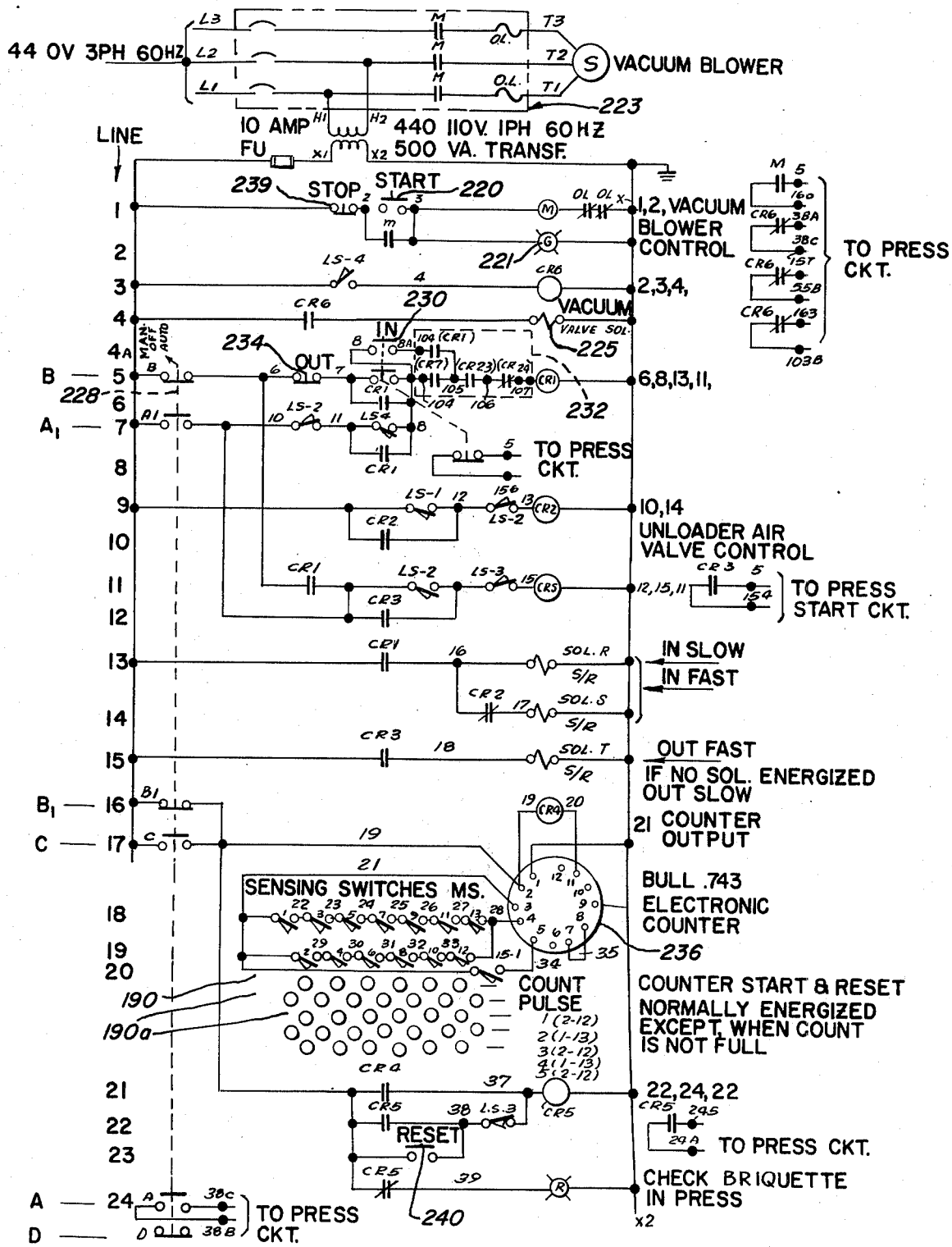

PRESS UNLOADER

BACKGROUND OF THE INVENTION

Pumice briquettes are granulated volcanic stone briquettes bonded together by a suitable bonding agent and compressed in a forming press. In one exemplary configuration, the briquettes are generally triangular in shape although they have curved edge surfaces. In recent years pumice briquettes have found considerable commercial acceptance as grease burning elements in gas fired outdoor grills. That is, the briquettes are placed below the grill, and when the grease drips on the briquettes it vaporizes in a manner similar to the effect achieved in a charcoal broiler and serves the same taste enhancing function without the decomposition disadvantage of charcoal briquettes. Heretofore, forming machines for briquettes of this type have been manually unloaded. This is an extremely tiresome, time consuming and expensive function because there are a large number of briquettes formed on each stroke of the forming press.

There have in the past been provided automatic pickers with rubber diaphragms that push construction bricks, much larger and heavier than the pumice briquettes from brick presses. However, these operate with the press charging device from the side of the bricks and are not at all suitable for removing the briquettes or bricks from above.

While vacuum material handling devices have been applied in other material handling areas, they have not, insofar as applicants are aware, been applied to handling briquettes, or even to handling bricks during the unloading operation from the press. The various general utility material handling devices, such as found in the metal working arts, have been found to be completely unacceptable for handling pumice briquettes or bricks because their composition, shape and number in the press present problems not found in any other art.

For this reason it is a primary object of the present invention to provide a brick or briquette unloading apparatus for a forming press that will simultaneously unload a plurality of formed articles from above the lower mold half by raising the articles upwardly and outwardly from the press all in a completely automatic and simple operation, interlocked with the operation of the press itself.

SUMMARY OF THE PRESENT INVENTION

In accordance with the present invention an unloading apparatus is provided for a brick press, or more particularly, a pumice briquette press for unloading a plurality of the articles from the press after forming when the press is stopped with the press dies parted. The unloading apparatus consists basically of a frame having tracks that support a generally linearly reciprocable unloading carriage. The unloading carriage has rollers riding on these tracks and has a plurality of cup shaped vacuum devices projecting downwardly from one end thereof for seizing articles from the press mold, transferring them to and discharging them on a discharge table or conveyor adjacent the press.

In the briquette unloading device described specifically herein, there is provided one vacuum cup for transferring each briquette. However, if bricks, rather than briquettes, are being formed, then a plurality of cups would be provided for seizing each brick.

The motion of the unloading carriage is basically reciprocal from a retracted or "normal" position with the article holding vacuum devices over the discharge table to an extended position where the vacuum devices are disposed vertically above the lower mold boxes in the briquette press.

For the purpose of lowering the unloading carriage frame into the article seizing position so that the vacuum cups may be moved downwardly toward the briquettes, cranks are provided between the rollers and the unloading carriage frame. These cranks remain at a fixed angle during reciprocal movement of the unloader so that the unloader remains in a raised position during this phase entering the unloader from above the briquettes, but the cranks are turned through sprockets and cams when the unloader is at the loading station so that the vacuum cups are lowered.

To assure that the unloading carriage remains horizontal during the lowering motion and article seizing over the mold boxes, forward and rear sets of rollers are provided on the carriage each having a crank. These cranks are driven simultaneously through the provision of sprockets on each crank interconnected with sprockets on the other set of rollers by chains. The sprockets on one roller set have followers that engage a fixed cam to control movement of the cranks and hence the lifting and lowering of the unloader carriage frame.

The carriage is driven by a reciprocating piston and cylinder device that through a pulley drive is connected to the chains driving the sprockets. The chains drive the carriage both during its horizontal reciprocating movement as well as during its lowering and raising movement when picking up the briquettes in the press. To accomplish this the cam controlling movement of the sprocket followers prevents rotation of the sprockets during reciprocating travel of the carriage, but permit rotation of the sprockets and the resulting downward or upward pivoting of the carriage frame, while maintaining it horizontal when the pickup vacuum cups are over the mold boxes. A control circuit is provided for the unloader that has both manual and automatic modes interlocked with the operation of the press. Basically, the control operates to move the unloader over the briquettes between the open upper and lower dies when a signal is received from the press control indicating that the press is open with the lower die flush with the mold top. The carriage is driven and controlled at a fast rate toward a position above the briquettes until the vacuum pickup cups are a short distance from the briquettes at which time the unloader feed is reduced to a low rate until the cups are above the briquettes. After the unloader and connected pickup cups are lowered so that the cups pick up the briquettes, the unloader is withdrawn at a rapid rate from the press. A plurality of sensing switches are provided between the press and the discharge table which engage the rows of briquettes in the pickup cups as the cups move from the press to the discharge table. These switches are connected through a counting circuit to count each of the briquettes in the pickup cups. If one or more of the briquettes is missing, the counting circuit provides no output and a signal is shortly thereafter provided that terminates operation of the press. This prevents the press from recycling and permits the operator to clean the missing briquette from the press, the unloader having failed to remove the briquette from the machine for one reason or another.

After the machine is cleaned, the operator, through the provision of appropriate control circuitry resets the press cycle terminate circuitry, and the press begins operation again providing a signal to the unloader control circuit forming another set of briquettes.

In the automatic mode the unloader continously cycles and will enter the press for briquette pickup upon receipt of a signal from the press circuit indicating the press has completed its cycle. No other manual input is necessary for unloader cycling during the automatic mode. In the manual mode, an "IN" button must be depressed to initiate operation of the unloader to unload the press, but this circuitry is operative only upon receipt of a press cycle complete signal from the press circuitry. After the briquettes are picked up by the vacuum cups, an "OUT" button is depressed to move the unloader carriage toward the discharge table. The counting circuitry, for terminating operation of the press if less than all of the briquettes has been unloaded from the press, is operative also during the manual mode to terminate press operation upon receipt of a deficient briquette count.

BRIEF DESCRIPTION OF THE DRAWINGS

FIG. 1 is a side elevation of the unloader with the pickup cups disposed in the daylight space in the briquette press;

FIG. 2 is a plan view of the unloader shown in FIG. 1;

FIG. 3 is an end view of the unloader shown in FIG. 1;

FIG. 4 is a fragmentary side elevation of the upper frame illustrating the unloader carriage drive;

FIG. 5 is a fragmentary plan view of the drive mechanism shown in FIG. 4;

FIG. 6 is a sub-assembly elevation view of the carriage drive shown in FIG. 4;

FIG. 8 is a fragmentary cross-section of the pickup carriage manifold;

FIG. 9 is a fragmentary section of the pickup head illustrating one of the pickup cups;

FIG. 12 is a control schematic for the carriage drive;

FIG. 13 is a speed curve for the carriage during unloader cycling; and

FIG. 14 is a control circuit for the unloader with press interface controls.

DETAILED DESCRIPTION OF THE PREFERRED EMBODIMENT

Figure 10:
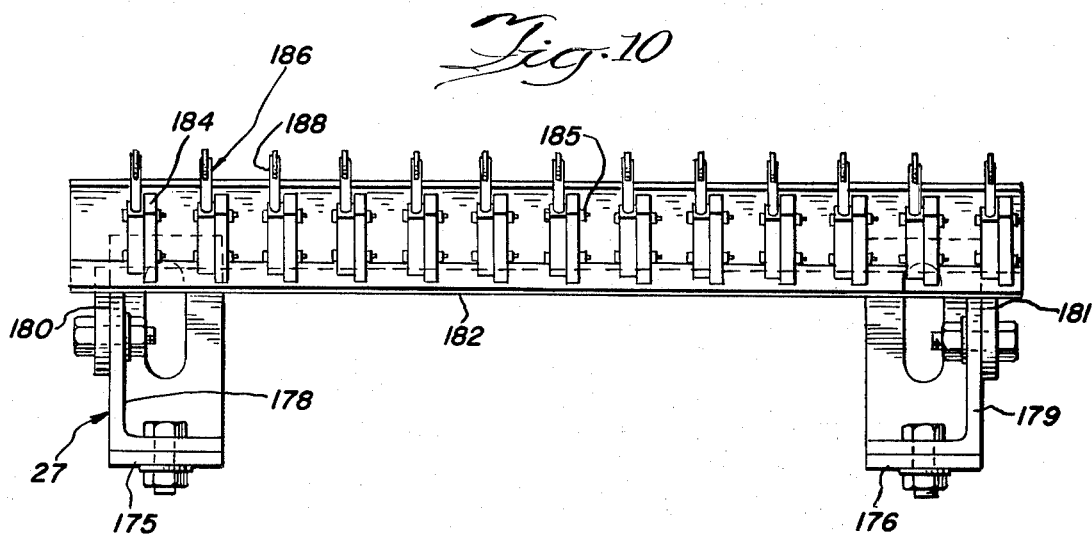
FIG. 10 is a sub-assembly plan view of the counter switch sensing bracket.

Referring to the drawings and particularly FIGS. 1 to 3, a briquette unloader 10 is illustrated having a pickup head 12 in the daylight space of a briquette forming press 13 having an upper platen 14, a lower platen 15, upper die members or plungers 17 and a mold box 19.

The press is adapted to form generally triangular pumice stone briquettes 21.

Press 13 is of the same general type as the brick press shown in the Barkham Pat. No. 2,716,900, assigned to the assignee of the present invention. Such presses include lower and upper vertically movable dies, operated by a toggle mechanism, that compress particulate material in mold openings or boxes. After the brick is compressed the dies separate and the lower die raises until it is flush with the top of the mold box.

The briquettes 21 are generally triangular in configuration and are constructed of granulated pumice with a suitable bonding agent. After removal from the press 13 the briquettes 21 are baked. These briquettes are approximately two and one-half inches in diameter and are suitable for use in gas operated outdoor cookers, the briquettes providing the same grease burning function that charcoal briquettes provide in charcoal burners, although the pumice briquettes have only minimum decomposition during use as compared to charcoal briquettes, as is well known in the art. It should be understood, however, that the principles of the present invention are applicable to unloading particulate bricks as well as briquettes.

The pickup head 12 has vacuum pickup cups 23 on the lower surface thereof, each adapted to seize one of the briquettes 21. The number and arrangement of the pickup cups 23 correspond to the number and locations of the individual briquette mold boxes.

Under the control of suitable control circuitry the pickup head 12 enters between the parted dies prior to entry of the charger, picks up the briquettes 21 and shifts to the right as viewed in FIG. 1 releasing the briquettes on a discharge table or conveyor 25. Prior to this discharge, however, the briquettes in the pickup head 12 are counted by counting circuitry associated with briquette engaging sensing switch bank 27 shown in FIGS. 1 and 2. If one of the briquettes is missing from the pickup head 12, press 13 is automatically stopped to permit cleaning of the press.

The unloader 10 is seen to consist generally of a lower rectangular frame 30 supporting an upper rectangular frame 31 adjustable on the lower frame by suitable adjusting devices 32. The upper frame has parallel stationary spaced rails 33 and 34 that support a reciprocating unloader carriage 38 shown more clearly in FIGS. 2 and 3. The tracks 33 and 34 guide carriage 38 by providing a trackway for rollers 40, 41, 42, and 43 effecting pure horizontal reciprocating motion from a retracted position where the pickup head 12 is over the discharge table 25 to an extended position where the pickup head is over the briquettes 21 with the dies separated.

For the purpose of lowering the pickup head 12 so that the cups 23 engage the briquettes 21, crank mechanisms 40' and 41' are provided in the carriage assembly 38 and serve to pivot carriage frame 44 downwardly from the position shown in FIG. 1 to a position where the cups 23 engage briquettes 21.

A vacuum, applied to cups 23, serves to draw the briquettes into the cups and hold them there during the transfer function.

To apply a vacuum to the cups 23, the head 12 and frame 44 define manifold passages communicating with a vacuum producer 46 driven by motor 47 and connected to frame 44 through filter 48, flexible conduit 49 and header 50. Header 50 applies a vacuum to frame 44 through flexible conduits 52, 53 and 54 shown more clearly in FIG. 3. A solenoid operated valve 56 shown in FIG. 3 is operable to terminate the vacuum applied to vacuum cups 23 when the pickup head 12 is over the discharge table so that the briquettes 21 may be released.

Referring to a description of the frame 30 in more detail, it is seen to consist of four vertical angle members 58, 59, 60 and 61 spaced apart by front and rear angle members 66 and 67 as well as intermediate forward and rear channel members 69 shown in FIG. 3. Interconnecting the legs lengthwise are upper angle members 70 and intermediate angle members 71.

The lower frame members 71 support a channel 85 that in turn supports header 50. Also the rear legs 60 and 61 have fixed thereto a channel 87 for the purpose of attaching the frames associated with vacuum producer 46 and motor 47 to the main lower frame 30.

The upper frame 31 consists of two vertically oriented wide web channel members 73 and 74 fixed together and spaced apart by top transverse angle members 77 and 78 and bottom channel members 80 and 81 shown in FIG. 1. The channel members 80 and 81 support the parallel spaced carriage tracks 33 and 34 shown in FIG. 3.

There are four adjusting mechanisms 32, one being provided at each corner of the upper frame 31 to adjustably support the upper frame 31 on the lower frame 30. In this manner the exact attitude of the pickup head 12 with respect to the press may be adjusted as desired.

The carriage assembly manifold frame 44 has spaced channel members 88 and 89 interconnected at their forward ends by flange 90 and their rear ends by frame member 91. Within the frame members is carried a manifold including a receiving header 93 transversely disposed with respect to the carriage and shown more clearly in FIG. 8. The receiving manifold 93 has three fittings 94 projecting downwardly therefrom which receive the flexible conduits 52, 53, and 54 shown in FIG. 3. Communicating with receiving header 93 are horizontal manifold tubes 95, 96 and 97 (FIG. 2) that communicate with a forward header 100 also transversely disposed with respect to the unloading carriage 38. Header 100 has a plurality of openings 101 that communicate directly with the interior of the hollow pickup head 12, the pickup cups 23 being eliminated from FIG. 8 for clarity. The pickup cups 23 are shown more clearly in FIG. 9 and are seen to include a molded rubber cup 104 which receives a hollow threaded fitting 105 threadedly received in lower member 107 of pickup head 12 and spaced therefrom by a suitable spacer 108.

Thus, a vacuum is applied to the pickup cups 23 through flexible conduit 49, frame header 50, flexible conduits 52, 53 and 54, receiver header 93, tubes 95, 96 and 97, forward header 100, the interior of pickup head 12, and the hollow threaded members 105. It should be noted that the flexible conduits 52, 53, 54 permit movement of the carriage 38 without interrupting the vacuum application to pickup cups 23.

For a description of the supporting and driving mechanism of the carriage 38 reference will be made to FIGS. 4, 5 and 6 noting that the unloader is reversed in FIGS. 4 and 5 from the views shown in FIGS. 1 and 2, respectively.

As noted above, the carriage 38 rolls horizontally and is lowered and raised at the press to pickup the briquettes. The crank assemblies 40' and 41' serve the basic function of raising and lowering the carriage with respect to the rollers 40, 41, 42 and 43. Toward this end, a crank 110 (FIG. 5) is provided associated with carriage wheels 40 and 41. Crank 110 includes a central rod 112 pivotally mounted in bearing bosses 113 and 114 carried by carriage frame members 89 and 88, respectively. The rod 110 projects from both bearings 113 and 114 and has cranks 117 and 118 fixed to these projecting ends. Stub shafts 120 and 121 are eccentric with respect to rod 112 and fixed to the cranks 117 and 118, respectively, and project outwardly therefrom. The stub shafts 120 and 121 have journalled thereon the wheels 40 and 41, respectively, and also have keyed thereto chain sprockets 124 and 125, respectively. Note that the wheels 41 and 40 are not fixed to the stub shafts 120 and 121 so that the carriage 38 may move horizontally without rotation of the sprockets 124 and 125. However, upon rotation of the sprockets, as will appear hereinbelow, the crank arms 117 and 118 will pivot, lowering or raising the frame 44 with respect to the wheels.

The crank assembly 41' associated with wheels 42 and 43 is identical to that described above with respect to crank 40' except sprockets 129 and 130 carry cam followers 131, 132 and 133 (see FIG. 4) for the purpose of selectively rotating the sprockets. Followers 132 and 133 are diametrically opposed as shown in FIG. 4 while follower 131 is approximately 60 degrees from follower 133.

Figure 7:
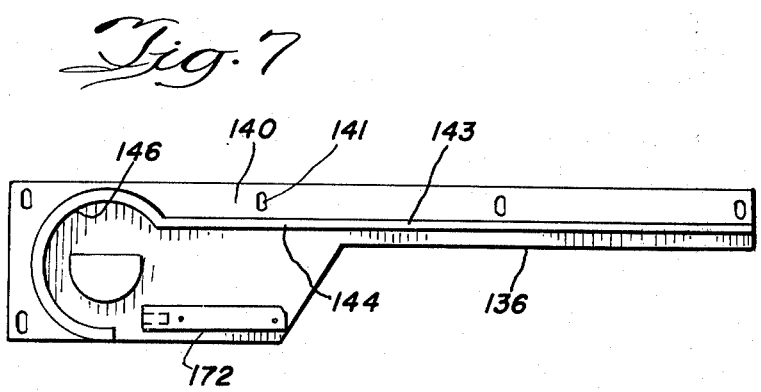
FIG. 7 is a sub-assembly view of one of the cams controlling lowering and lifting of the unloader carriage.

The rotation of the followers 131, 132 and 133 is controlled by cams 136 fixed to the inside of frame members 73 and 74, it being understood that the cam members on the opposite sides are not identical but mirror images of one another. A sub-assembly view of cam member 136 is shown in FIG. 7 and is seen to include a base plate 140 having elongated apertures 141 to permit adjustable positioning on the inside of frame member 73 and 74.

The base plate 140 has projecting inwardly therefrom a camming track 143 having a lower surface 144 which the follower rollers 131 and 132 engage during reciprocation of the carriage 38. The camming tract 143 also has an arcuate portion 146 in which all three of the camming rollers 131, 132 and 133 travel and engage as the sprockets rotate. The rollers 131 and 132 are spaced so that they can simultaneously engage the lower surface 144 of cam track 143.

Therefore, as long as one of the rollers 131 or 132 engages straight cam surface 144 sprockets 129 and 130 will be unable to pivot about their own axes, however, upon shifting the carriage to the position where the axis of the sprockets 129 and 130 is coincident with the center of revolution of the cam surface 146, the sprockets will be free to rotate about their own axes with the cam followers 131, 132 and 133 engaging cam surface 146. It is during this rotation that the crank arm 41' is rotated to lower the carriage.

The carriage 38 is lowered at the pickup station and this is done while maintaining the carriage and the pickup head 12 in a horizontal attitude. Toward this end, the cranks 40' and 41' are operated simultaneously. To do this a link chain 148 (FIG. 5) interconnects sprockets 129 and 124 while a link chain 150 interconnects sprockets 130 and 125 for simultaneous timing and rotation.

The carriage assembly is driven through the chains 148 and 150 so that the same drive affects both reciprocation of the carriage 38 as well as the lowering and raising movement thereof. Toward this end a control bar 152 as shown in FIGS. 4 and 5 is provided having a suitable fastening device 156 at each end thereof interconnected approximately centrally to the chains 148 and 150.

The control bar 152 is reciprocated longitudinally by a pneumatic air cylinder 158 having a piston 159 driving the opposite ends 161 and 162 of a cable wrapped around pulleys 163 and 164. The ends of the cables are fixed to a bracket 167 carried centrally by control bar 152, by fittings 170 and 171. Assuming the carriage to be initially in its left position with sprocket 130 in position 130' indicated in FIG. 4, the carriage is then in the completely retracted or normal position.

With the porting of air to the right side of piston 159 in air cylinder actuator 158, pulley 164 will rotate counterclockwise pulling cable end 162 thereby pulling control bar 152 to the right. The cam followers 131 and 132 then ride on the straight surface 144 and prevent rotation of any of the sprockets so that the carriage assembly rolling on tracks 33 and 34 has pure horizontal reciprocating motion. When the pickup head 12 reaches its position above the die cavities 19, the carriage 38 will be in a position where the axis of sprocket 130 is coincident with the axis of the arcuate cam surface 146. At this time, linear reciprocating motion of the carriage 38 is arrested. However, with air being continued to be ported to the right side of piston 159, control bar 152 will continue to move to the right driving the chains 148 and 150, rotating the sprockets about their own axes since the followers 131, 132 and 133 are free to rotate within the arcuate portion 146 of the cam track. This pivots the crank assemblies 40' and 41' lowering the carriage frame 44 and the pickup head 12, while maintaining these parts horizontal, to a position where the pickup cups 23 engage and hold the adjacent briquettes.

Upon engagement of and pickup of the briquettes, carriage 38 actuates a limit switch LS-2 (FIG. 12) which reverses the flow of air to actuator 158, porting air to the left side of piston 159 thereby pulling on cable end 161. This drives the control bar 152 to the left rotating the sprockets in a counter-clockwise direction when viewed in FIG. 4 until the cam followers 131 and 132 are in the same horizontal plane as indicated in FIG. 4. At this time follower 131 may escape from the arcuate portion 146 of the cam track and the sprockets shift leftwardly from the position shown in FIG. 4. A suitable elongated stop 172 is fixed to and extends inwardly from cam plates 140 for the purpose of engaging cam follower 133 to preclude further counterclockwise rotation of the sprocket 130 after it escapes leftwardly from the arcuate portion 146 as viewed in FIG. 4. Cam surface 144 prevents clockwise rotation and hence all of the sprockets are precluded from rotating about their own axes after the carriage 38 begins shifting from the left as viewed in FIG. 4 or the right as viewed in FIGS. 1 and 2.

Figure 11:
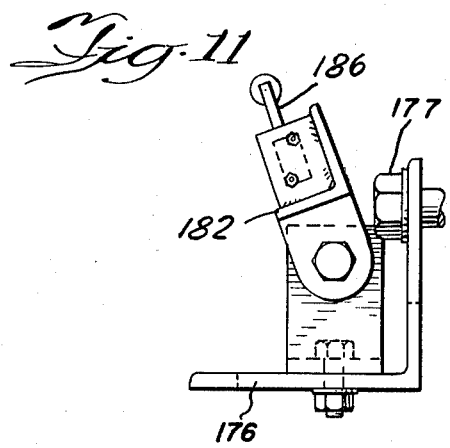
FIG. 11 is a side view of the counter switch sensing bracket shown in FIG. 10.

As noted above, the briquettes are sensed by a bank of sensing switches 27 shown in FIGS. 1 and 2 for the purpose of determining if all of the briquettes are present in the unloading mechanism after it is withdrawn from the press. The switch bank is shown more clearly in FIGS. 10 and 11 and is seen to include angle brackets 175 and 176 that are fixed to the frame of the press by suitable fasteners 177. Angle brackets 178 and 179 are fixed to the lower flange of brackets 175 and 176, respectively, and carry pivotal arms 180 and 181 welded to a transverse L-shaped angle member 182. Angle member 182 is adapted to be disposed transverse to the direction of movement of the pickup head 12. Fixed within the angle member 182 are thirteen switch supports 184 which have fasteners 185 for attaching switches 186 thereto. Each of the thirteen microswitches 186 has an actuating plunger 188 disposed in a position to engage the briquettes, if present, in every other row of pickup cups as the pickup head 12 travels over the sensing switch bank 27. The microswitches 186 are positioned so that when the first row 190 of pickup cups (FIGS. 1 and 14) passes over the sensing bank 27, the briquettes therein will actuate the even numbered microswitches, i.e. MS-2, 4, 6, 8, 10 and 12, while the odd number microswitches MS-1, 3, 5, 7, 9, 11 and 13 are actuated by briquettes in row 192. Thus, each microswitch operates on briquettes in alternate rows minimizing the possibility of false triggering of any of the microswitches, while at the same time minimizing the number of required microswitches.

Reference will now be made to FIGS. 12 and 13 for a description of the vacuum and air supply systems of the present invention along with the appropriate positioning of limit switch control. The carriage drive control, press control, and vacuum supply control are provided at four reference points defined by limit switches LS-1, LS-2, LS-3 and LS-4. These limit switches are attached to a frame of the machine and are actuated by a control projection 191 carried by the pickup carriage 38. LS-4 is positioned so that it is actuated by projection 191 when the carriage 38 is in its normal retracted position with pickup head 12 over the discharge conveyor 25. Limit switch LS-2 is positioned to be actuated by projection 191 when the pickup cups 23 engage the briquettes in the press during forward motion of the unloader. Limit switch LS-1 is positioned a sufficient distance from limit switch LS-2 to provide appropriate slow-down for the carriage 38 as it approaches the press. Limit switch LS-3 is positioned a sufficient distance from limit switch LS-4 to provide a suitable slow-down for the carriage 38 as it retracts from the press to the discharge table. Limit switch LS-1 is actuated by projection 191 as the carriage moves toward the pickup station but is not actuated by the projection as the carriage moves away from the pickup station. Limit switch LS-3 is actuated by projection 191 as the carriage moves toward the unload station but is not actuated by the projection 191 as the carriage moves away from said unload station. The limit switch locations are also designated by curves 192a and 193a in FIG. 13.

Air selectively supplied to the opposite sides of piston 159 by a four-way directional control valve 194 receives a supply of air under approximately 80 psi through line 196, having a lubricator 197, a regulator 198 and a filter 199 therein. Valve 194 is operated by solenoid R from the position shown in FIG. 12 supplying air to line 202, to its lower position supplying air to line 203. With valve 194 in the position shown porting fluid to line 202, bypass check valve 206 permits the free flow of air to the left side of piston 159. Similarly, bypass valve 208 permits the free flow of air to the right side of piston 159 when line 203 is pressurized. Exhaust valve 210 when actuated by solenoid S permits the free flow of exhaust fluid from the left side of piston 159 to pass therethrough to effect a rapid advance for carriage 38. With solenoid S deenergized in the position shown, valve 210 will block flow, requiring return flow to pass through restrictor 212, retarding exhaust flow thereby effecting a slow speed advance of carriage 38 as indicated by curve portion 192a' in FIG. 13.

Exhaust valve 214 similarly controls exhaust flow from the right side of piston 159. That is, with valve 194 pressurizing line 202, and moving piston 159 to the right, the energization of solenoid T will place valve 214 in a position freely exhausting flow from the right side of piston 159 effecting a rapid retract for the unloading carriage 38. When solenoid T is deenergized, free exhaust flow is blocked and exhaust flow must pass through restrictor 216 effecting a slow speed retract of the pickup head carrying the briquettes on final approach to the discharge table.

The control circuit for the unloader, along with interface controls with the press 13 is illustrated in FIG. 14. The control circuit will be described with respect to the operation of the unloader and press.

To initiate operation of the unloader, start button 220 in line 1 is depressed energizing relay M closing holding contacts m in line 2 maintaining relay M energized along with a green light 221 on the control panel (not shown). Closure of contacts m in the vacuum blower circuit 223 initiates the drive of motor 47 connected to the vacuum producer. In this manner the vacuum is initiated. However, at this point the carriage 38 is in its fully retracted or "normal" position with projection 191 opening normally closed limit switch LS-4 in line 3, deenergizing relay CR-6 and opening contacts CR-6 in line 4 deenergizing solenoid 225 closing valve 56 in the vacuum header shown in FIG. 3 interrupting the vacuum source. Relay CR-6 also has contacts in the associated press control circuit (not shown) that prevent operation of the press when relay CR-6 is energized so that the press can only operate with the unloader retracted.

To initiate the manual operation of the unloader selector switch 228 is placed in the "Manual" position which functions to close switch contacts B, B$_1$ and D. With contacts B closed in line 5, relay CR-1 will be energized upon the depression of the "IN" switch 230 assuming a circuit is provided through the various contacts in a portion of the press control circuit indicated at 232. These contacts are in their closed state when the press 13 has completed its operation and is ready for unloading.

Assuming control 232 to indicate a "go" condition for unloading, the operator's depression of the "IN" switch 230 energizes relay CR-1 and closes holding contacts CR-1 in line 6 maintaining relay CR-1 in line 5 energized.

With relay CR-1 energized, contacts CR-1 in line 13 close energizing both solenoid R and solenoid S of valves 194 and 210 driving the carriage 38 from its normal position off limit switch LS-4 toward the open press. Shortly before the carriage reaches a position where the head 12 is over the briquettes in the press, projection 191 engages limit switch LS-1 closing the same in line 9, energizing relay CR-2 which in turn closes holding contacts CR-2 in line 10. With the energization of relay CR-2 the normally closed contacts thereof in line 14 open deenergizing solenoid S, shifting valve 210 upwardly to the position shown in FIG. 12 effecting a slow speed final advance for the carriage 38 as head 12 moves to its final position with the cups 23 engaging the briquettes. When the carriage reaches its final forward position, the projection 191 engages limit switch LS-2. The closure of switch LS-2 at the end of the forward Manual stroke of the unloading carriage will not energize reversing relay CR-3 in line 11 since normally closed contacts CR-1 in line 11 are open. Upon depression of "OUT" switch 234 in line 5 relay CR-1 will become deenergized, holding contacts in line 6 will open, and normally closed contacts CR-1 in line 11 will close permitting reversing relay CR-3 to become energized closing its contacts in line 15. This energizes solenoid T, and with solenoid R deenergized the carriage rapidly retracts since valve 194 pressurizes line 202 with solenoid R deenergized.

Carriage 38 thus rapidly retracts and the briquettes, row by row, pass over the sensing switch bank 27 illustrated diagramatically in lines 18 and 19 in FIG. 14. Closure of limit switch LS-1 in line 20 during the forward stroke resets counter 236 by activating counter contact 5. Counter 236 is a conventional counter and may be the elecronic counter manufactured by E. W. Bliss Company illustrated in Bulletin 743, dated February, 1969. The first row 190 of briquettes closes switches 2, 4, 6, 8, 10 and 12 in line 19 providing a signal at contact 4 of the counter if all of the briquettes in row 190 are present, since the switches in line 19 are arranged in series. Thereafter the briquettes in line 190a pass over the switches in line 18 closing the switches 1, 3, 5, 7, 9, 11 and 13, if all briquettes are present and providing a second signal at contact 4 of the counter. An additional pulse is provided as each succeeding full row of briquettes passes over the sensing switches MS-1 to MS-13 and when five pulses have been received by counter 236, representing that each of the five rows of briquette holders 23 is full of briquettes, the counter 236 closes contacts which energize relay CR-4 in line 16.

The energization of relay CR-4 closes contacts CR-4 in line 21 providing a parallel circuit for holding the "stop" press relay CR-5 energized, thus, when the carriage 38 further retracts, opening the parallel holding circuit through LS-3 in line 22, relay CR-5 will remain energized and will have no affect on the press control circuit.

On the other hand if counter 236 receives a count of less than five from lines 18 and 19 indicating that one or more of the briquettes is missing, the counter 236 will not energize relay CR-4 in line 16 and its contacts in the parallel circuit in line 21 will not be energized. In this case when the carriage retracts to limit switch LS-3 opening the same in line 22, the parallel circuit to relay CR-5 will be open and the relay will be deenergized opening holding contact CR-5 in line 22. Relay CR-5 when deenergized opens contacts in the press control circuit (not shown) that are operative to disable the press 13. At the same time the normally closed contacts CR-5 in line 24 close providing current to a red "check briquette and press" light on the control panel (not shown) indicating to the operator that he should clean the missing briquette or briquettes from the press.

After the operator has cleaned the press he pushes reset button 240 in line 23 which energizes relay CR-5 across limit switch LS-3 noting that the carriage 38 has at that time ridden over limit switch LS-3 and returned to its normal position. This closes the holding circuit through line 22 permitting the press to operate again and turns off the red check press light in line 24 by opening contact CR-5 therein.

At the same time the counting check was occurring upon opening limit switch LS-3 in line 22, the same switch was open in line 11 deenergizing relay CR-3 dropping out its holding contacts in line 12 and opening its contacts in line 15, cutting off the current to solenoid T associated with exhaust control valve 214, thereby effecting a slow movement of the carriage to the discharge point as indicated by curve portion 193a' in FIG. 13. When pickup head 12 reaches the discharge table limit switch LS-4 will be engaged opening the switch in line 3 and deenergizing relay CR-6 which opens its contacts in line 4 and terminates current to the vacuum solenoid 225 closing vacuum valve 56 and permitting the pickup cups to release the briquettes on the discharge table or conveyor.

The operation of the unloader control is similar in the "Auto" mode except that the unloader reverses itself automatically and recycles automatically if the press has completed its cycle properly. Toward this end selector switch 228 when placed in the Auto mode closes contacts A, A₁ and C. Switch A₁ energizes contact relay CR-1 with contact CR-1 in line 8 locking the relay in across limit switch LS-4 which is closed in the normal or retracted position of the carriage 38. Contacts CR-1 in line 13 close energizing solenoids R and S associated with valves 194 and 210 respectively and drive the carriage in its forward stroke toward the press at the rapid feed rate. When the carriage projection 191 closes limit switch LS-1 in line 9, relay CR-2 opens its normally closed contacts in line 14 and effects the slow advance in the same manner as it does in the manual mode. At the time the vacuum cups 23 grasp the briquettes at the end of the forward carriage stroke, limit switch LS-2 in line 11 closes, energizing relay CR-3 and holding it by contacts CR-3 in line 12. This closes contacts CR-3 in line 15 energizing solenoid T. At the same time limit switch LS-2 in line 7 drops out the holding contacts of CR-1 in line 8 deenergizing CR-1 and thereby opening its contacts in line 13, deenergizing solenoid R associated with control valve 194. This effects an automatic reversal of the carriage and provides a fast discharge stroke. On the return stroke the counting mechanism associated with counter 236 operates in the same manner as in the manual mode to detect less than a full number of briquettes in the unloader head 12 and serves to interrupt operation of the press if all briquettes are not present. In any event regardless of the count of counter 236 the unloader will continue in its discharge stroke after engaging limit switch LS-3 which drops relay CR-3 in line 11 out opening contact CR-3 in line 15, deenergizing solenoid T associated with valve 214 and permitting the discharge phase to be completed at a slow cushioned rate.

At the end of the discharge stroke limit switch LS-4 is depressed opening the normally closed switch in line 3, deenergizing contact relay CR-6 and thereby cutting off the current to solenoid 225 in line 4 interrupting the vacuum and permitting the briquettes to be released from the vacuum pickup cups 23. At the same time, limit switch LS-4 in line 7 closes again energizing contact relay CR-1 in line 5 and locking it in by its contacts in line 8 if the press control contacts 232 indicate the press 13 is operating properly and has completed its cycle of operation. This initiates another unloader cycle.

The vacuum blower may be shut off by switch 239 in line 1 after completion of operation of the unloader.

We claim:

1. An unloading apparatus for an article forming machine, comprising: unloader frame means, an article seizing carriage mounted for generally horizontal movement on said frame means, means for moving said carriage from a retracted position to a position above the articles to be seized, and means including crank means for pivoting the carriage downwardly toward the articles to be seized, said crank means maintaining the carriage horizontal while pivoting the carriage downwardly, said frame means including generally spaced horizontal ways, wheels on said carriage engaging said ways, said crank means pivoting said carriage with respect to said wheels.

2. An unloading apparatus for an article forming machine, comprising: unloader frame means, a pair of parallel spaced ways on said frame means, said ways being generally horizontally disposed, an article seizing carriage mounted for reciprocating on said ways and having rollers engaging said ways, said carriage including a carriage frame supported for movement by said rollers, and crank means between said rollers and said carriage frame for pivoting the carriage frame with respect to the rollers while maintaining the carriage horizontal.

3. An unloading apparatus for an article forming machine, comprising: unloader frame means, a pair of parallel spaced ways on said frame means, said ways being generally horizontally disposed, an article seizing carriage mounted for reciprocating on said ways and having rollers engaging said ways, said carriage including a carriage frame supported for movement by said rollers, crank means between said rollers and said carriage frame for pivoting the carriage with respect to the frame, means for pivoting said crank means at the article seizing position of the carriage including stationary cam means, and means engageable with said cam means for turning said crank means, said crank means maintaining said carriage horizontal during pivotal movement thereof.

4. An unloading apparatus as defined in claim 3, wherein said means for turning said crank means includes a disc member fixed with respect to said crank and having follower means engaging said cam means.

5. An unloading apparatus for an article forming machine, comprising: unloader frame means, a pair of parallel spaced ways on said frame means, said ways being generally horizontally disposed, an article seizing carriage mounted for reciprocating on said ways and having rollers engaging said ways, said carriage including a carriage frame supported for movement by said rollers, crank means between said rollers and said carriage frame for pivoting the carriage with respect to the frame, means for pivoting said crank means at the article seizing position of the carriage including stationary cam means, and means engageable with said cam means for turning said crank means, and a forward set of rollers and a rear set of rollers engaging said ways, a crank associated with each set of rollers for pivoting the carriage frame with respect to said rollers, and means separate from said cam for simultaneously pivoting both of said cranks.

6. An unloading apparatus as defined in claim 5, wherein said means for pivoting both of said cranks includes a sprocket fixed to each end of each of said cranks adjacent each of said rollers, chain means interconnecting the sprockets on each side of the carriage frame, and drive means fixed to both of said chain means for reciprocating the carriage.

7. An unloading apparatus as defined in claim 6, wherein said cam means prevents rotation of the sprockets during horizontal movement of said carriage and permits the rotation of the sprockets and downward pivoting movement of the carriage when the carriage is at the article seizing position.

8. An unloading apparatus as defined in claim 7, wherein said drive means includes a reciprocating fluid actuator fixed to said unloader frame.

9. An unloading apparatus for an article forming machine, comprising: frame means, an unloader carriage movable in said frame means from an article seizing position to an article release position, said unloading carriage having a plurality of article seizing means carried thereby, said article seizing means being arranged in parallel rows generally transverse to the direction of movement of the unloading carriage from the article seizing station to the article release station, the article seizing means in one row being staggered with respect to the article seizing means in at least one other row, and means for sensing the presence of an article in each of said article seizing means, said means for sensing the presence of an article in each of said article seizing means including support means arranged transversely to the direction of movement of the unloading carriage, a plurality of switches on said support means fixed in a single row, a first set of said switches being positioned to engage articles in one row and a second set of said switches being positioned to engage articles in another row.

10. An unloading apparatus as defined in claim 9, means connecting said first switch means in series and providing an output signal upon the presence of all of the articles in the associated row, means connecting said second set of switch means in series and providing a signal when all of the articles in the associated row are present, and counter means responsive to said signal for providing a signal indicating the presence of all of the articles in more than one row.

11. An unloading apparatus for an article forming machine, comprising: frame means, an unloading carriage movable on said frame means from an article seizing position to an article release position, a plurality of article seizing means on said unloading carriage, means for sensing the presence of articles in said article seizing means including a first set of switches engageable by a first set of articles, a second set of switches engageable by a second set of articles, means connecting said first set of switches together in series and providing a signal when the presence of all articles in the first set has been sensed, and means connecting the second set of switches in series and providing a signal when the presence of all of the articles in the second set is sensed.

12. An unloading apparatus as defined in claim 11, including a counter response to both of said signals for providing an output signal.

13. An unloading apparatus as defined in claim 11, wherein said article seizing means are cup shaped vacuum devices.

14. An apparatus as defined in claim 12, wherein said counting means is operative as the unloading carriage moves from the article seizing position to the article release position, and control means for continuing movement of said unloading carriage from the article seizing station to the article release station even though the predetermined number of articles are not present as determined by the counting means.

* * * * *